United States Patent [19]

Kubisa et al.

[11] Patent Number: 4,891,194

[45] Date of Patent: Jan. 2, 1990

[54] METHOD FOR SCRUBBING FLUE GASES FROM A FIRING UNIT

[75] Inventors: Ryszard Kubisa; Helmut Voos, both of Gummersbach, Fed. Rep. of Germany

[73] Assignee: L. & C. Steinmüller GmbH, Gummersbach, Fed. Rep. of Germany

[21] Appl. No.: 916,838

[22] Filed: Oct. 9, 1986

[30] Foreign Application Priority Data

Oct. 16, 1985 [DE] Fed. Rep. of Germany ....... 3536893

[51] Int. Cl.$^4$ .................... C01B 7/00; C01B 17/00; B01J 8/00
[52] U.S. Cl. .................................. 423/240; 423/244
[58] Field of Search .................... 423/244 A, 240 S

[56] References Cited

U.S. PATENT DOCUMENTS

| | | | |
|---|---|---|---|
| 3,372,528 | 3/1968 | Hoff | 75/25 |
| 4,061,476 | 12/1977 | Hölter et al. | 423/244 A |
| 4,201,751 | 5/1980 | Hölter et al. | 423/244 A |
| 4,273,750 | 6/1981 | Hollett, Jr. et al. | 423/244 |
| 4,309,393 | 1/1982 | Nguyen | 423/244 A |
| 4,355,013 | 10/1982 | Bechthold et al. | 423/242 |

FOREIGN PATENT DOCUMENTS

| | | |
|---|---|---|
| 0044916 | 1/1987 | European Pat. Off. . |
| 0114477 | 4/1987 | European Pat. Off. . |
| 2205719 | 8/1980 | Fed. Rep. of Germany . |
| 2905719 | 8/1980 | Fed. Rep. of Germany ... 423/244 A |
| 602166 | 7/1978 | Switzerland ............. 423/244 A |
| 2095655 | 10/1982 | United Kingdom . |

*Primary Examiner*—Gregory A. Heller
*Attorney, Agent, or Firm*—Becker & Becker, Inc.

[57] ABSTRACT

A method and apparatus for scrubbing flue gases coming from a firing unit. After absorbent has been added to the firing unit and/or to the flue gases, the flue gases are divided into at least two partial streams, one of which is immediately conveyed to a dust separator, and the other of which is first conveyed through a finishing reaction section, and only then to a dust separator.

13 Claims, 1 Drawing Sheet

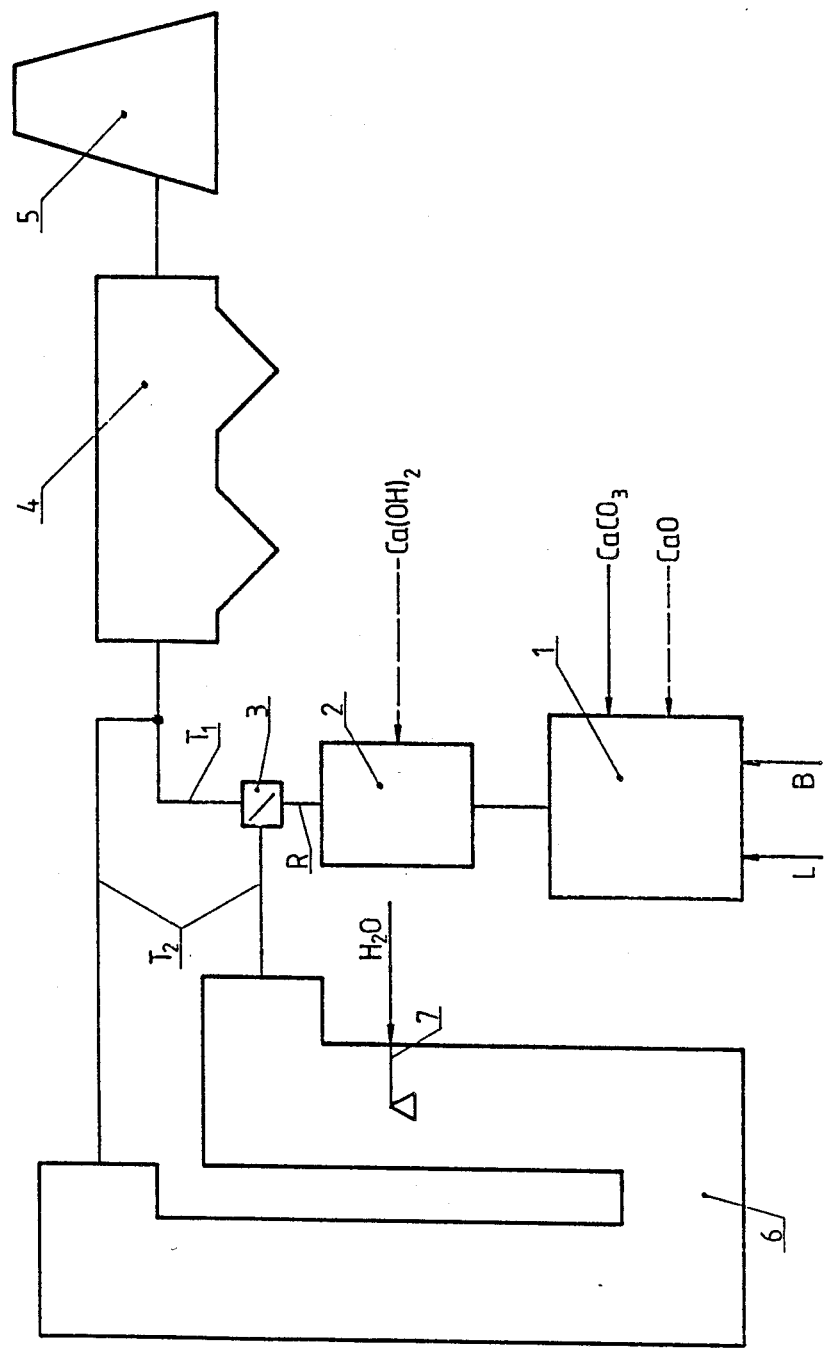

METHOD FOR SCRUBBING FLUE GASES FROM A FIRING UNIT

BACKGROUND OF THE INVENTION

1. Field of the Invention

The present invention relates to a method of scrubbing flue gases coming from a firing unit, including the steps of adding dry, fine-grained absorbent that contains at least one alkaline earth, and subsequently separating dust from the flue gases. The present invention also relates to an apparatus for scrubbing flue gases coming from a firing unit, and includes a combustion chamber, means for adding absorbent to the combustion chamber and/or the flue gases, and a subsequently connected dust connector.

3. Description of the Prior Art

German Offenlegungsschrift 30 15 977 Hölter et al dated Nov. 5, 1981 discloses a method of the aforementioned general type, according to which, preferably subsequent to a first dust separation stage, the absorbent is blown into a dry reaction section, and the thus treated flue gas is subjected to the separation of dust in a further subsequently connected dust collector or separator. All of the flue gas leaving the firing mechanism (boiler firing or fluidized bed firing) is conveyed through the dry chemical absorption reaction section. The absorbent serves to extract $SO_2$, HF, HCl from the flue gas, with named examples for the absorbent including: calcium hydroxide, calcium carbonate, and fine white lime.

German Offenlegungsschrift 29 05 719 Mohn et al dated Aug. 21, 1980 discloses a method of scrubbing flue gas via an absorption liquid, with subsequent spray drying. Prior to being treated with a liquid, the flue gases are divided into two partial streams, one of which is supplied to a spray drying phase of a concentrated salt solution that forms during the treatment, and is then supplied to a subsequent dust separation phase, while the other partial stream is again combined with the first partial stream prior to the flue gas scrubbing phase. This combination of the partial streams can also take place prior to the dust separation phase.

An object of the present invention is to provide a method and apparatus of the aforementioned general types with which, in a simple manner, the extraction of harmful or noxious gases from the flue gas can be improved.

BRIEF DESCRIPTION OF THE DRAWING

This object, and other objects and advantages of the present invention, will appear more clearly from the following specification in conjunction with the accompanying schematic drawing, which is a flow diagram illustrating the operation of the present invention.

SUMMARY OF THE INVENTION

The method of the present invention is characterized primarily in that after the addition of the absorbent, and without preliminary separation of dust, at least one partial stream of the flue gases is subjected immediately to dust separation, with at least one other partial stream being subjected to dust separation only after a prescribed secondary final, or finishing reaction time.

The finishing reaction time preferably lasts only several seconds, for example 5 seconds. Due to this prescribed finishing reaction time of one of the partial streams, for example 50% of the flue gases that leave the firing mechanism, a greater level of scrubbing is achieved in that partial stream that in the partial stream that is conveyed directly to the dust separator. After combining the partial streams, the entire flue gas stream is sufficiently scrubbed of noxious gases.

An absorbent in carbonate form is preferably introduced into the combustion chamber of the firing mechanism at a temperature that is sufficient for a decarbonization of the absorbent. Preferred absorbents include limestone or calcite ($CaCO_3$), dolomite ($CaCO_3 + MgCO_3$), or magnesium carbonate.

However, it is also possible to introduce an absorbent in hydroxide form into a gas flue connected subsequent to the combustion chamber at a temperature that prevents dehydration. The preferred material is calcium hydroxide ($Ca(OH)_2$).

Finally, it is also possible to use an absorbent in oxide form, such as burnt lime (CaO).

It is, of course, also possible to use mixtures of the aforementioned absorbents.

In order to even further improve the scrubbing level that was already improved in the finishing reaction section, it is advantageous to spray water into the partial stream at the beginning of the finishing reaction time. This is of particular advantage in those cases in which the alkaline earth is present in oxide form in the flue gas at the beginning of the finishing reaction time. This is so because it has been shown that when the oxide is converted with water to hydroxide, not only is the reactive surface of the absorbent considerably increased, but the speed of reaction of the noxious gas binding is also considerably increased.

In this connection, it should be noted that absorption of the noxious gases takes place not only during the finishing reaction, but a certain percentage of the binding action is already achieved during the direct binding prior to dividing the flue gas stream into partial streams. Thus, for example, a direct binding of 30% of $SO_2$ is achieved.

It is furthermore preferred that the water be introduced into the partial stream in the finishing reaction section in the direction of flow of this partial stream. This helps to keep the overall length of the finishing reaction section short.

In order in a predetermined overall length to achieve a relatively long finishing reaction time, for example of 5 seconds, it is expedient that the partial stream change directions several times.

It is particularly advantageous to separate dust from the partial stream that has been subjected to finishing reaction and from the partial stream that has not been subjected to finishing reaction together in the same dust separator.

The apparatus of the present invention is characterized primarily in that a device for dividing the flue gas stream of the firing mechanism into at least two partial streams is disposed ahead of the dust separator, with one of the partial streams, for a predetermined finishing reaction time, being conveyed to a finishing reaction section that is disposed between the dividing device and the dust separator, with the other partial stream being conveyed directly to the dust separator.

A device for spraying water into the partial stream that is converted through the finishing reaction section is preferably provided essentially at the beginning of said finishing reaction section.

Further specific features of the present invention will be described in detail subsequently.

DESCRIPTION OF PREFERRED EMBODIMENTS

Referring now to the drawing in detail, air L and fuel B are supplied to a firing mechanism 1 (boiler firing or fluidized-bed firing). Via a schematically illustrated gas flue 2, the flue gases are supplied to a similarly only schematically illustrated device 3 for dividing the flue gas stream R into two partial streams $T_1$ and $T_2$. The device 3 is preferably adjustable in order to be able to take into consideration different load conditions and/or different fuels. The partial stream $T_1$ is supplied directly to a dust collector or separator 4, preferably an electric filter, and is thereafter conveyed to a chimney or smoke stack 5. The partial stream $T_2$ is supplied to a secondary, final, or finishing reaction section 6 in which the flue gas undergoes deflection in order to achieve a relatively long finishing reaction time with a relatively short overall length. The partial flue gas stream $T_2$, after undergoing finishing reaction, is conveyed to the dust collector or separator 4. In the illustrated embodiment, the partial streams $T_1$ and $T_2$ are mixed together prior to entering the dust separator 4. However, these partial streams $T_1$ and $T_2$ could also be introduced separately into the dust collector 4, or could even be subjected to removal of dust in different separators.

As illustrated in the drawing, the absorbents are supplied to the firing mechanism 1 in the form of carbonates and/or oxides. In contrast, the absorbents are supplied to the subsequently connected gas flue 2 in hydroxide form. By way of example, the appropriate calcium compounds have been indicated on the drawing.

An example utilizing calcium carbonate will now be discussed in detail. When pulverized limestone or calcite ($CaCO_3$) is added to the firing mechanism 1, the following decarbonization reaction takes place at a temperature of greater than 75° C.:

$$CaCO_3 \rightarrow CaO + CO_2$$

The resulting free CaO serves to bind the noxious or harmful gases in a heterogeneous gas-solid reaction. In particular, at temperatures below 1120° C., the sulfur dioxide reacts with the CaO to form calcium sulfite. A portion of the calcium sulfite reacts with the oxygen contained in the flue gas to form calcium sulfate:

$$CaO + SO_2 \rightarrow CaSO_3$$

$$CaO + SO_2 + \tfrac{1}{2}O_2 \rightarrow CaSO_4$$

At the same time, the CaO, which is preferably present under greater than stoichiometric conditions, reacts, at temperatures below 790° C., or below 1150° C., with the further noxious gases HCl and HF contained in the flue gas to form calcium chloride or calcium fluoride respectively.

With the conventional short connections between the gas flue 2 and the dust separator 4, the conversion of the free CaO to the corresponding reaction products is limited by the short retention time. With the present invention, however, since the partial stream $T_2$ is conveyed through the finishing reaction section or station 6 with a retention time of, for example, 5 seconds, the conversion is improved considerably.

Pursuant to the preferred way of carrying out the inventive method, the conversion of CaO is considerably improved even further by spraying water in. Downstream from the spray location 7 for water, the CaO introduced into the finishing reaction section 6 with the partial stream $T_2$ is converted to calcium hydroxide:

$$CaO + H_2O \rightarrow Ca(OH)_2$$

This not only increases the reactive surface, but also further improves the speed of reaction. In other words, the finishing reaction section 6 can be kept short. The binding of the $SO_2$ that is still present in the partial stream $T_2$, i.e. $SO_2$ that was not absorbed by the direct binding, can be described by the following reaction equation:

$$Ca(OH)_2 + SO_2 \rightarrow CaSO_3 \cdot \tfrac{1}{2}H_2O + \tfrac{1}{2}H_2O$$

A portion of the calcium sulfite is oxidized to form calcium sulfate:

$$CaSO_3 \cdot \tfrac{1}{2}H_2O + \tfrac{1}{2}O_2 \rightarrow CaSO_4 \cdot \tfrac{1}{2}H_2O$$

$$CaSO_3 \cdot \tfrac{1}{2}H_2O + \tfrac{1}{2}O_2 + 1\tfrac{1}{2}H_2O \rightarrow CaSO_4 \cdot 2H_2O$$

HCl and HF react with the calcium hydroxide to form the corresponding salt compound pursuant to the following equations:

$$2HCl + Ca(OH)_2 \rightarrow CaCl_2 + 2H_2O$$

$$2HF + Ca(OH)_2 \rightarrow CaF_2 + 2H_2O$$

Thus, the material separated off in the dust separator 4 comprises mixtures and agglomerates of calcium sulfite and calcium sulfate in various stages of hydration, calcium chloride, calcium fluoride, as well as flue dust or fly ash. The actual proportion of the individual materials in this separated-off material depends upon the specific operating conditions of the unit.

Due to the combination of the dry desulfurization process, i.e. the addition of dry, fine-grained absorbent to the firing mechanism 1 or into the gas flue 2, as a function of the desired or permissible temperature, it is possible to realize an overall desulfurization level of 90%, with, for example, 75% of the flue gases being conveyed as a partial stream through the finishing reaction section. The addition of calcium relative to the sulfur in the flue gas stream ahead of the dividing device 3 is under greater than stoichiometric conditions, and is preferably in the range of from 1.5 to 5. The cooling that takes place in the partial stream $T_2$ due to the preferred spraying-in of water is essentially compensated for by being mixed with the warm partial stream $T_1$ prior to entering the chimney.

The air preheater of the firing unit (industrial boiler, refuse combustion unit, etc.) is preferably disposed between the gas flue 2 and the dividing device 3. The magnitude of the partial stream $T_2$ that is to be branched-off is a function of the scrubbing level that is to be achieved, of the desired temperature at the inlet to the chimney, and of the quantity of gas. The inventive method is particularly suitable for firing units of less than 300 MW.

The present invention is, of course, in no way restricted to the specific disclosure of the specification and drawing, but also encompasses any modifications within the scope of the appended claims.

What we claim is:

1. A method of scrubbing flue gases coming from a firing unit, comprising the steps of adding to said flue gases dry, fine-grained absorbent that comprises at least one alkaline earth metal in the form of carbonate, hydroxide, or oxide, and subsequently separating dust from said flue gases, with initial reaction between said flue gases and absorbent commencing with the addition of said absorbent; said method comprises the steps of:
   after said step of adding absorbent, and without separately removing any absorbent from said firing unit and prior to any separation of dust, dividing said flue gases into at least one first stream, and at least one second stream;
   conveying said first stream directly to a dust separator;
   conveying said second stream through a finishing reaction section of sufficient length to essentially complete reaction between said second stream and said absorbent during a finishing reaction time; and only then
   conveying said second stream to a dust separator.

2. A method according to claim 1, which further comprises the step of introducing absorbent in carbonate form into said firing unit at a temperature adequate for decarbonization of said absorbent.

3. A method according to claim 1, which further comprises the step of introducing absorbent in hydroxide form into a gas flue connected after said firing unit at a temperature that prevents dehydration of said absorbent.

4. A method according to claim 1, which further comprises the step of using an absorbent in oxide form.

5. A method according to claim 1, which further comprises the step of using an absorbent in the form of a mixture of compounds selected from the group consisting of carbonates, hydroxides, and oxides.

6. A method according to claim 1, which further comprises the step of spraying water into said second stream at the beginning of said finishing reaction time.

7. A method according to claim 6, which further comprises the step of spraying-in said water in the direction of flow of said second stream.

8. A method according to claim 7, which further comprises the step of subjecting said second stream to several changes in direction.

9. A method according to claim 1, which further comprises the step of separating dust from said first and second streams together.

10. A method according to claim 1, which further comprises the step of combining said first and second streams prior to conveying them to a dust separator.

11. A method of scrubbing flue gases coming from a firing unit, comprising the steps of adding to said flue gases dry, fine-grained absorbent that comprises at least one alkaline earth metal in the form of carbonate, hydroxide, or oxide, and subsequently separating dust from said flue gases, with initial reaction between said flue gases and absorbent commencing with the addition of said absorbent; said method comprises the steps of:
   introducing absorbent in carbonate form into said firing unit at a temperature adequate for decarbonization of said absorbent;
   after said step of adding absorbent, and prior to any separation of dust, dividing said flue gases into at least one first stream, and at least one second stream;
   conveying said first stream directly to a dust separator;
   conveying said second stream through a finishing reaction section of sufficient length to essentially complete reaction between said second stream and said absorbent during a finishing reaction time;
   spraying water into said second stream at the beginning of said finishing reaction time; and only after said second stream has been conveyed through said finishing reaction section,
   conveying said second stream to a dust separator.

12. A method of scrubbing flue gases coming from a firing unit, comprising the steps of adding to said flue gases dry, fine-grained absorbent that comprises at least one alkaline earth metal in the form of carbonate, hydroxide, or oxide, and subsequently separating dust from said flue gases, with initial reaction between said flue gases and absorbent commencing with the addition of said absorbent; said method comprises the steps of:
   using an absorbent in oxide form;
   after said step of adding absorbent, and prior to any separation of dust, dividing said flue gases into at least one first stream, and at least one second stream;
   conveying said first stream directly to a dust separator;
   conveying said second stream through a finishing reaction section of sufficient length to essentially complete reaction between said second stream and said absorbent during a finishing reaction time;
   spraying water into said second stream at the beginning of said finishing reaction time; and only after said second stream has been conveyed through said finishing reaction section,
   conveying said second stream to a dust separator.

13. A method of scrubbing five gases coming from a firing unit, comprising the steps of adding to said flue gases day, fine-grained absorbent that comprises at least one alkaline earth metal in the form of carbonate, hydroxide, or oxide, and subsequently separating dust from said flue gases, with initial reaction between said flue gases and absorbent commencing with the addition of said absorbent; said method comprises the steps of:
   introducing absorbent in hydroxide form into a gas flue connected after said firing unit at a temperature that prevents dehydration of said absorbent;
   after said step of adding absorbent, and prior to any separation of dust, dividing said flue gases into at least one first stream, and at least one second stream;
   conveying said first stream directly to a dust separator;
   conveying said second stream through a finishing reaction section of sufficient length to essentially complete reaction between said second stream and said absorbent during a finishing reaction time; and only then
   conveying said second stream to a dust separator.

* * * * *

UNITED STATES PATENT AND TRADEMARK OFFICE
CERTIFICATE OF CORRECTION

PATENT NO. : 4,891,194
DATED : 2 January 1990
INVENTOR(S) : Ryszard Kubisa et al It is certified that error appears in the above-identified patent and that said Letters Patent is hereby corrected as shown below:

In the claims: Claim 13, line 1, change "five" to -- flue --;

Signed and Sealed this

Eleventh Day of December, 1990

*Attest:*

HARRY F. MANBECK, JR.

*Attesting Officer*      *Commissioner of Patents and Trademarks*